United States Patent
Lee et al.

(10) Patent No.: US 7,975,550 B2
(45) Date of Patent: Jul. 12, 2011

(54) MICROMACHINED SENSOR FOR MEASURING VIBRATION

(75) Inventors: Myung Lae Lee, Busan (KR); Chang Han Je, Daejeon (KR); Sung Sik Lee, Milyang (KR); Sung Hae Jung, Daejeon (KR); Chang Auck Choi, Daejeon (KR); Gunn Hwang, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 529 days.

(21) Appl. No.: 12/111,841

(22) Filed: Apr. 29, 2008

(65) Prior Publication Data
US 2009/0320595 A1    Dec. 31, 2009

(30) Foreign Application Priority Data

Dec. 10, 2007    (KR) .................. 10-2007-0127880

(51) Int. Cl.
*G01N 29/00* (2006.01)
*G01P 15/10* (2006.01)
(52) U.S. Cl. .................... 73/649; 73/504.04; 73/514.29; 73/514.31
(58) Field of Classification Search .............. 73/649, 73/504.04, 514.26, 514.29, 514.32, 514.33, 73/514.34, 514.37, 702, 703; 381/396, 412
See application file for complete search history.

(56) References Cited

U.S. PATENT DOCUMENTS

| | | | |
|---|---|---|---|
| 4,805,456 A | | 2/1989 | Howe et al. |
| 5,341,682 A | * | 8/1994 | Hulsing, II ................ 73/504.04 |
| 5,461,918 A | | 10/1995 | Mozurkewich |
| 5,528,939 A | * | 6/1996 | Martin et al. .................. 73/702 |
| 6,487,300 B1 | * | 11/2002 | Lee et al. ...................... 381/396 |
| 6,557,414 B2 | * | 5/2003 | Sakurai et al. ............. 73/504.04 |
| 6,738,489 B2 | * | 5/2004 | Chung et al. .................. 381/396 |
| 6,853,532 B2 | * | 2/2005 | Miyajima et al. ............. 361/187 |
| 7,076,079 B2 | * | 7/2006 | Chung .......................... 381/404 |
| 7,358,633 B2 | * | 4/2008 | Kweon et al. .................. 310/81 |

FOREIGN PATENT DOCUMENTS

| | | | |
|---|---|---|---|
| JP | 04-020864 A | | 1/1992 |
| JP | 4100038674 A | * | 2/1998 |
| JP | 410282121 A | * | 10/1998 |
| JP | 11-230983 A | | 8/1999 |
| KR | 1019990049308 A | | 7/1999 |
| WO | WO 90/10206 A1 | | 9/1990 |

* cited by examiner

*Primary Examiner* — Jacques M Saint Surin

(57) ABSTRACT

There is provided a micromachined sensor for measuring a vibration, based on silicone micromachining technology, in which a conductor having elasticity is connected to masses moving due to a force generated by the vibration and the vibration is measured by using induced electromotive force generated due to the conductor moving in a magnetic field.

18 Claims, 6 Drawing Sheets

MICROMACHINED SENSOR FOR MEASURING VIBRATION

CROSS-REFERENCE TO RELATED APPLICATIONS

This application claims the priority of Korean Patent Application No. 2007-0127880 filed on Dec. 10, 2007, in the Korean Intellectual Property Office, the disclosure of which is incorporated herein by reference.

BACKGROUND OF THE INVENTION

1. Field of the Invention

The present invention relates to a sensor for measuring a vibration, using a theory in which an induced current occurs when a conductor moves in a magnetic field, and more particularly, to a micromachined sensor for measuring a vibration, based on silicone micromachining technology in which a conductor is connected to masses moving due to a force caused by the vibration and the vibration is measured using induced electromotive power generated when the conductor moves in a magnetic field.

The present invention was partly supported by the IT R&D program of MIC/IITA [2006-S-054-02, titled: Development of CMOS based MEMS processed multi-functional sensor for ubiquitous environment]

2. Description of the Related Art

A micromachined sensor for measuring a vibration according to an exemplary embodiment of the present invention is one of sensors for a ubiquitous sensor network (USN). Particularly, in the case of a wireless sensor network, sensors are connected to one another via a wireless network and collect and monitor required environment information. Accordingly, such wireless sensor networks are generally, globally used.

As methods of mass-producing sensors that are essential elements for a wireless sensor network, recently, interests on micorelectromechanical system (MEMS) technology that is micromachining method using a semiconductor manufacturing process increase. The MEMS have advantages of mass production, subminiaturization, and low manufacturing costs since mechanical electronic devices manufactured by conventional mechanical processing may be collectively manufactured by a semiconductor process. Particularly, as conditions for sensors used in a wireless sensor network, low power, mass production, and low price are essential. Accordingly, MEMS type sensors may be most suitable.

As conventional sensors for measuring a vibration, there are used capacitance sensors, resonant frequency sensors, piezoelectric sensors, and piezoresistive sensors. However, in the case of such sensors have problems, it is required to electrically measure a capacitance and a frequency conversion, thereby complicating a signal processing method. Also, there are problems such as signal screen due to a parasitic capacitance and complexity of a device configuration. In addition, it is required to always generate a resonance by supplying power.

Problems of conventional technologies will be described as follows.

U.S. Pat. No. 4,805,456 discloses a resonant accelerometer in which a resonance frequency is differentiated, one mass is coupled with clamped-clamped beam type resonators opposite to each other interposing the mass therebetween, and the resonance frequency increasing and decreasing according to acceleration in an axis direction is used. In this case, compensation for a temperature is performed and the acceleration is differentiated. However, as defects, since the center of gravity of the mass is slanted to a bottom of a beam, the beam rotates due to the acceleration, thereby reducing a measuring area. Also, when the same beam is added on a bottom of a substrate to supplement this, tension of the beam becomes twice, thereby changing the resonant frequency and reducing sensitivity. Also, since the mass is separated from the beam, the resonance frequency is determined according to standards of the mass and the beam. When there is present a difference in the standards of the beams while manufacturing the same, the resonance frequency is changed. Also, since it is required to always supply power to the accelerometer, it is disadvantageous to be applied to wireless sensor network with low power.

U.S. Pat. No. 5,461,918 discloses a vibrating beam accelerometer capable of measuring magnitude of acceleration by measuring that a resonance frequency of a clamped-free vibrating cantilever, whose one end is fixed and another end is free, is changed by an external acceleration force. This technology is for removing a difficulty, in which a resonance frequency is determined according to standards of a mass and a vibrating beam, and provides a mass integrated with a vibrating beam. However, in this case, it is required to always supply power to the accelerometer that is a resonant type, which is disadvantageous to low power.

PCT/US90/00130 discloses a vibrating beam force transducer capable of measuring a resonance frequency changed by an external acceleration force while resonating as a phase of 180 degrees by using Lorentz's force generated when two conductive wires, through which currents flow opposite to each other, are present in a magnetic field. In this case, since it is required that the currents always flow, it is disadvantageous to low power consumption.

SUMMARY OF THE INVENTION

An aspect of the present invention provides a micromachined sensor for measuring a vibration, the sensor capable of easily sensing the vibration using low power and easily processing a signal in a wireless sensor network environment.

According to an aspect of the present invention, there is provided a micromachined sensor for measuring a vibration, the sensor including: a substrate; one or more of masses capable of moving in response to the vibration; a conductive spring formed of a conductor having elasticity and supporting the masses while moving according to movement of the masses; a fixing unit connected to the conductive spring to separate the masses and the conductive spring from the substrate; and a magnetic body formed on a bottom of the substrate and forming a magnetic field.

The fixing unit may be connected to both ends of the conductive spring.

The masses may be located in the middle of the conductive spring.

The sensor may further include a resistor forming a closed circuit including the conductive spring and the fixing unit. The sensor may further include a converter converting an induced current generated due to movement of the conductive spring, into a voltage.

The magnetic body may be further formed on a top of the fixing unit.

According to another aspect of the present invention, there is provided a device measuring a vibration, the device formed of the two micromachined sensors vertically disposed to measure vibrations of two or more axes.

According to still another aspect of the present invention, there is provided a micromachined sensor for measuring a vibration, the sensor including: a substrate; a conductive spring formed of a conductor having elasticity, including masses moving according to the vibration, on both ends thereof, and moving according to movement of the masses; a fixing unit connected to the conductive spring to separate the masses and the conductive spring from the substrate; and a magnetic body formed on a bottom of the substrate and forming a magnetic field.

The fixing unit may form spaces to allow the masses on the both ends of the conductive spring to move, respectively, while supporting the conductive spring.

The sensor may further include a resistor forming a closed circuit including the conductive spring and the fixing unit. The sensor may further include a converter converting an induced current generated due to movement of the conductive spring, into a voltage.

As described above, the micromachined sensor senses whether a vibration occurs, by measuring a current, different from conventional capacitance type vibration sensors. Accordingly, a signal processing circuit may be simplified and sensitivity with respect to the vibration may be increased.

Also, in the case of the micromachined sensor, to basically prevent problems such as changes of an initial capacitance generated in capacitance type sensors and a distortion of signal due to a parasitic capacitance, a current source generating a current is defined to a mass moved by a vibration in such a way that another noise does not occur, thereby increasing signal-to-noise ratio (SNR).

Also, in the case of the micromachined sensor, since an induced current does not occur when a vibration mode of a structure including a mass and a spring is anti-symmetric, rotational or transformed to be orthogonal to a direction of the spring in the structure, and a signal is not generated only in a basic mode, an influence on a vibration of an off-axis is small.

Manufacturing a signal processing circuit is simplified, thereby simplifying an overall configuration and reducing manufacturing costs.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
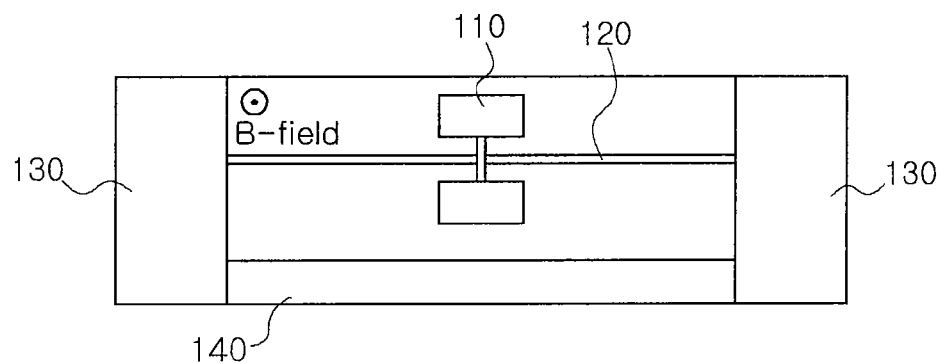
FIGS. 1A and 1B are a top view and a side view illustrating a configuration of a micromachined sensor for measuring a vibration, according to an exemplary embodiment of the present invention, respectively.

Exemplary embodiments of the present invention will now be described in detail with reference to the accompanying drawings. Only, in describing operations of the exemplary embodiments in detail, when it is considered that a detailed description on related well-known functions or constitutions may make essential points of the present invention be unclear, the detailed description will be omitted.

In the drawings, the same reference numerals are used throughout to designate the same or similar components.

Figure 1B:
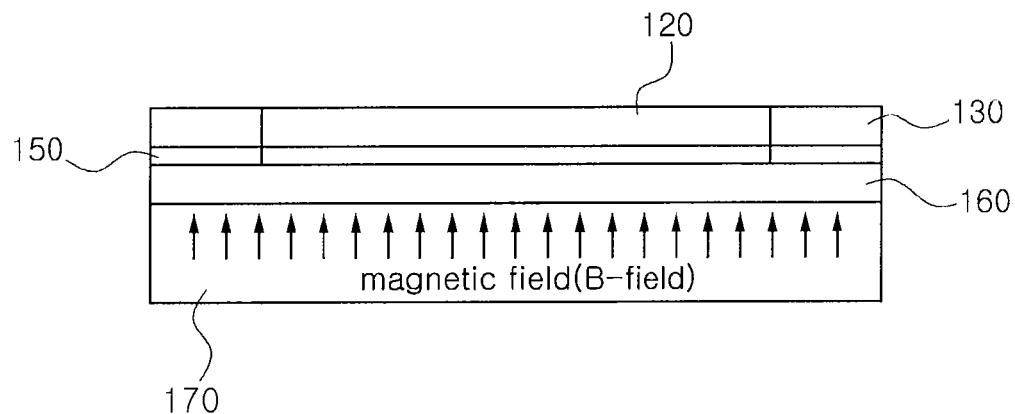

FIGS. 1A and 1B are a top view and a side view illustrating a configuration of a micromachined sensor for measuring a vibration, according to an exemplary embodiment of the present invention.

In the micromachined sensor, when masses 110 located in a magnetic field formed by a magnetic body 170 moves due to a vibration, a conductive spring 120 supporting the masses 110 moves in the magnetic field and forms an induced current, thereby sensing the vibration by the induced current. Hereinafter, each of elements will be described.

The micromachined sensor includes one or more of the masses 110 capable of moving in response to a vibration, the conductive spring 120 formed of a conductor having elasticity, supporting the masses 110, and moving according to movement of the masses 110, a fixing unit 130 connected to the conductive spring 120 and separating the masses 110 and the conductive spring 120 from a substrate 160, a magnetic body 170 formed on a bottom of the substrate 160 and forming a magnetic field, and a resistor 140 connecting the fixing units 130 on both sides and forming a closed circuit together with the conductive spring 120 and the fixing units 130.

The masses 110, when a vibration occurs in the substrate 160, move in an opposite direction to that of the vibration. In this case, the masses 110 are located in the middle of the conductive spring 120 and symmetrical to each other, interposing the conductive spring therebetween, to keep a static state when there is no vibration. However, this is just an exemplary embodiment and the present invention will not be limited thereto.

The conductive spring 120 is formed to support the masses 110 and moves based on a portion fixed to the fixing unit 130 when the masses 110 are moved by a vibration. As a result, the conductive spring 120 is displaced by the magnetic body 170 in the magnetic filed, thereby allowing an induced current to flow. Accordingly, the conductive spring 120 is formed of an elastic material to move according to movement of the masses 110. Also, the conductive spring 120 is formed of a conductor to allow a current to flow according to displacement on the magnetic field.

The fixing units 150 are connected to the conductive spring 120 to fix the both ends of the conductive spring 120 and separate the masses 110 and the conductive spring 120 from the substrate 160. Though there is shown that a supporter 150 is additionally provided to support the fixing units 130, the fixing units 130 and the supporter 150 may be formed in one body. In this case, to definitely indicate that the conductive spring 120 is separated from the substrate 160, the supporter 150 is shown. Also, the fixing units 150 or the supporter 150 may be formed of a conductive material to form the closed circuit as the resistor 140.

The fixing units or the supporter 150 is fixed on a top of the substrate 160.

On the bottom of the substrate 160, the magnetic body 170 is formed to form the magnetic filed. The magnetic filed is formed on the top of the substrate 160 by the magnetic body 170. Only, the magnetic body 170 may be formed on not only the bottom of the substrate 160 but also the top of the substrate 160 to increase intensity of the magnetic filed.

The resistor 140 forms the closed circuit by connecting the conductive spring 120 and the fixing units 130. To convert the induced current generated according to the movement of the masses 110 into a voltage, an Current-voltage conversion circuit may be connected to the resistor 140.

Figure 2A:
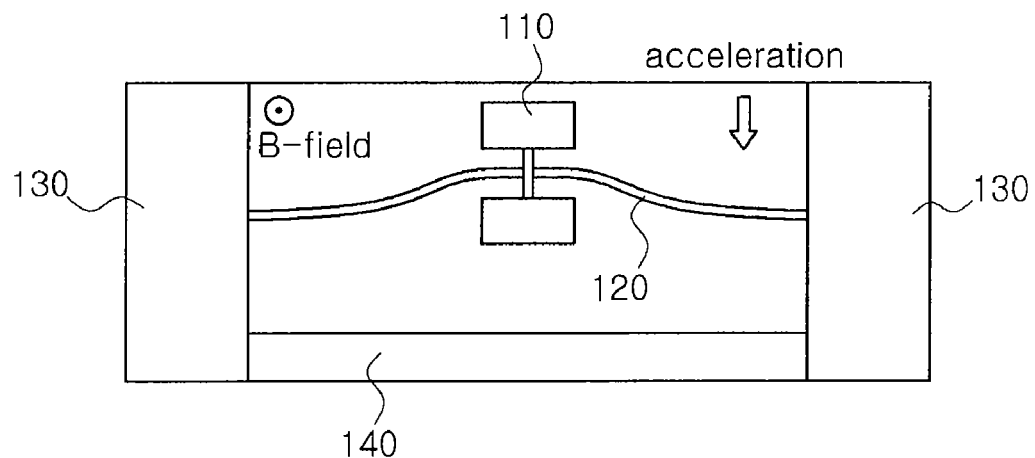
FIGS. 2A and 2B illustrate shapes of a conductive spring moving when an external vibration occurs, respectively.
Figure 2B:
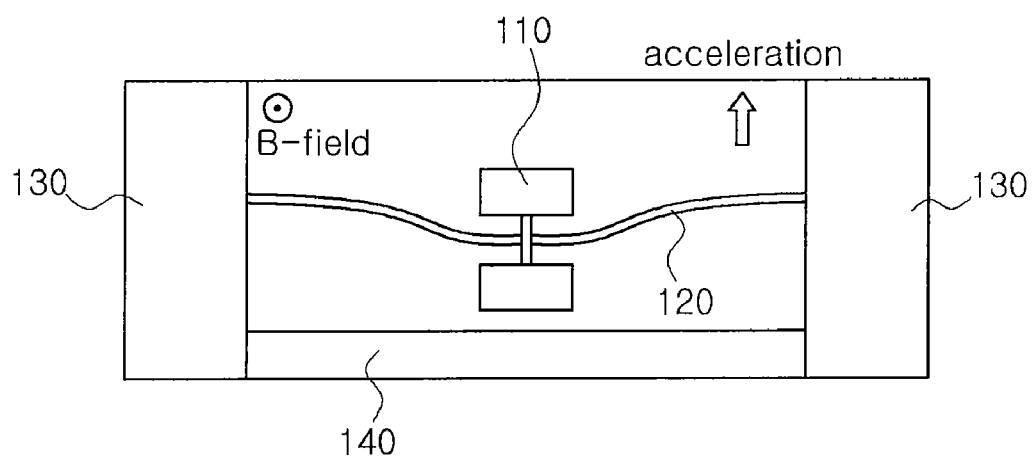
Figure 3A:
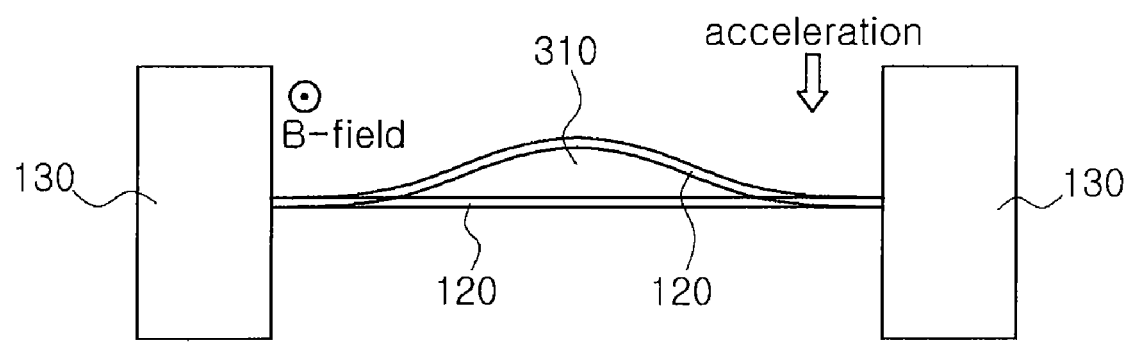
FIGS. 3A and 3B illustrate areas formed due to a change of the conductive spring when the external vibration occurs, respectively.
Figure 3B:
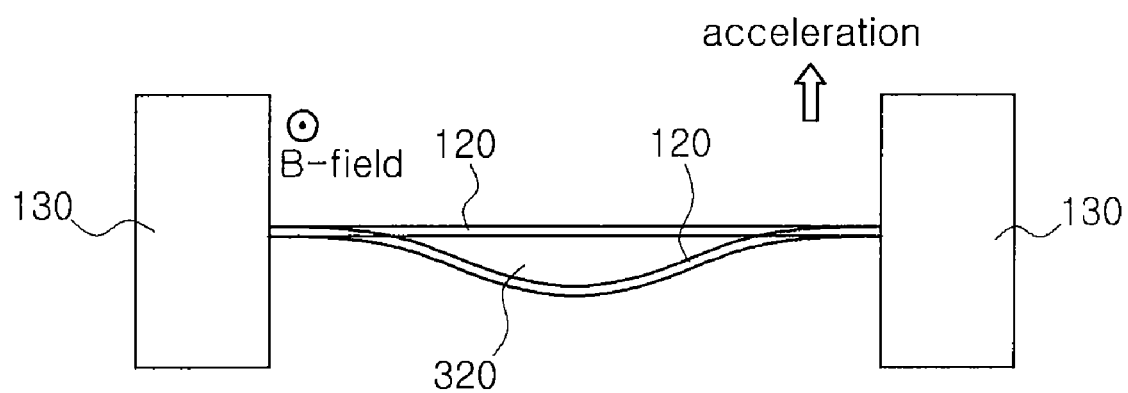

FIGS. 2A and 2B illustrate shapes of the conductive spring 120 moving when an external vibration occurs, respectively, and FIGS. 3A and 3B illustrate areas formed due to a change of the conductive spring 120 when the external vibration occurs, respectively.

In detail, in FIG. 2, when a force is applied parallel to a surface of the substrate 160 by an external vibration, the masses 110 accelerate in an opposite direction to that of the force and the conductive spring 120 connected to the masses 110 is moved, thereby changing a shape of an area formed of the closed circuit.

According to electromagnetic induction, when a conductor moves in a magnetic field B, an electromotive force occurs, whose magnitude is in proportion to a time change of magnetic flux Φ generated by the conductor. The magnetic flux Φ is a sum of internal areas of the magnetic filed B and an area S made by a conductive wire ∫B–dS. Accordingly, $$E = \frac{d\phi}{dt} = -\frac{d}{dt}\left(\int B \cdot dS\right).$$

In this case, – sign is according to Lentz's law. The motional electromotive force occurs in proportional to the magnitude of the vibration, the magnitude of frequency of the vibration may be estimated by measuring the motional electromotive force.

S changes in proportional to a direction and an intensity of acceleration. When the movement of the conductive spring 120 is symmetrical to a basic type as shown in FIG. 3, a size of the area thereof may be obtained by following Equation 2.

Figure 4A:
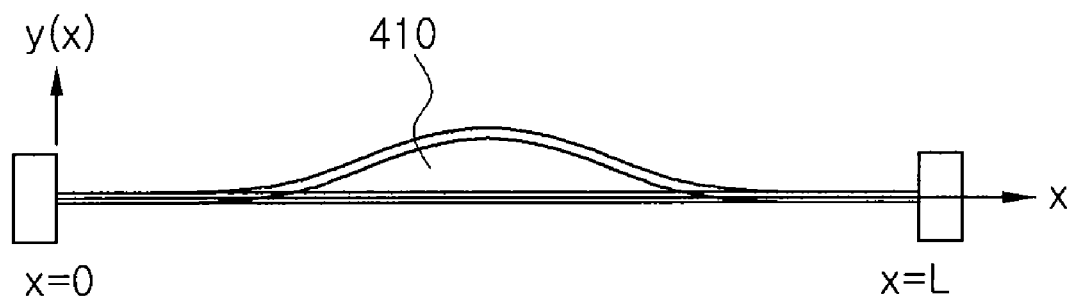
FIGS. 4A and 4B illustrate the areas of FIGS. 3A and 3B shown on coordinates.
Figure 4B:
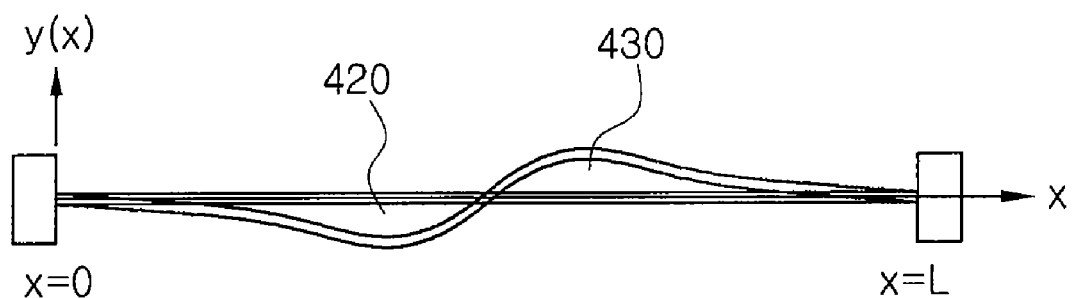

FIGS. 4A and 4B illustrate the areas of FIGS. 3A and 3B shown on coordinates. A height y(x) of the conductive spring 120 whose both ends are fixed, the conductive spring 120 transformed when an external force P is applied to a center thereof, is shown as following Equation 1 (cited reference: Introduction to deflection of beam, S. P. Timoschenko and J. N. Gooodier, McGraw-Hill, New York, 1970, 3rd ed.).

$$y(x) = \begin{cases} \dfrac{P}{YI}\left(\dfrac{Lx^2}{16} - \dfrac{x^3}{12}\right); & 0 \le x < \dfrac{L}{2} \\ \dfrac{P}{YI}\left(\dfrac{Lx^2}{16} + \dfrac{\left(x-\dfrac{L}{2}\right)^3}{6} - \dfrac{x^3}{12}\right); & \dfrac{L}{2} \le x \le L \end{cases} \quad \text{Equation (1)}$$

wherein L indicates a length of a spring beam, P indicates a force applied to a center of the spring beam, Y indicates Young's Modulus, and I indicates moment of inertia. Accordingly, the area S made by the spring beam when the force changed according to time is applied becomes $$\int_0^L y(x)\,dx.$$

$$S(L, P) = \frac{L^4 P}{384\, YI} \quad \text{Equation (2)}$$

wherein S(L, P) may depend on the magnitude P of the force, the length L of the spring beam, and the inertial moment I determined according to properties and a geometrical shape of a material. Also, since the external force P is caused by the vibration, the external force P has a physical value whose direction and magnitude vary with time.

As shown in FIG. 3, when the uniform magnetic field B formed by the magnetic body 170 and a surface 310 formed by the conductive wire cross at right angles, the magnetic flux Φ=S·B (Wb). Since a time change of the magnetic flux Φ is a motional electromotive force E, a relationship may be obtained as shown in following Equation 3.

$$E = -\frac{d\phi}{dt} = -B\frac{dS}{dt} = -\frac{BL^4}{384\, YI}\frac{dP}{dt} \quad \text{Equation (3)}$$

Since the external force P is caused by the vibration, the external force P is obtained by a function of a frequency, a direction, and magnitude of the vibration.

On the other hand, when a force is applied to a mass in an off-axis direction, the surface S is slanted. Accordingly, the magnetic flux Φ may be obtained by following Equation 4.

$$\Phi = \int B \cdot ds = \int B dS \cos \theta \quad \text{Equation (4)}$$

In this case, θ indicates an angle formed by the magnetic field and a micro area dS. In FIG. 4, with respect to a vertical transformation formed by movement of the spring beam in a z-axis direction or an x-axis direction, cos θ=0. Accordingly, an induced electromotive force does not occur. Also, in FIG. 4B, there is shown an anti-symmetric vibration mode. This may occur due to rotation or may be a cross mode due to vibration. In this case, since the changed area S=0 and a sensor output becomes 0, it is regardless of a signal in the off-axis direction. Therefore, the configuration according to an exemplary embodiment of the present invention provides ideal operation in which sensitivity is increased, when the direction of the surface S made by the conductive spring 120 due to the external force is identical to that of the magnetic field B, and becomes 0 with respect to a vertical force.

Figure 5A:
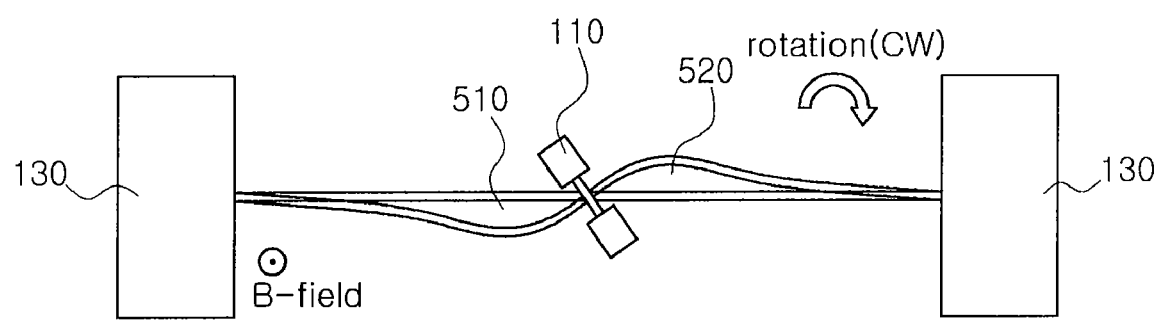
FIGS. 5A and 5B illustrate areas formed due to a change of the conductive spring, the change made by rotation.
Figure 5B:
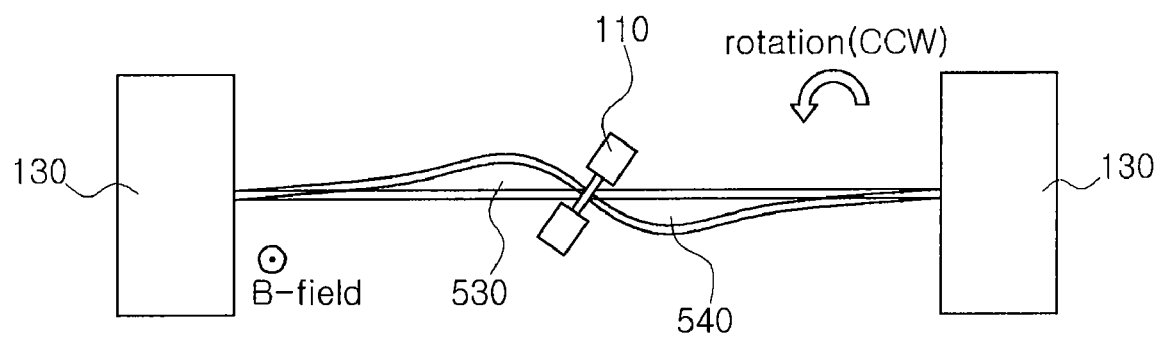

FIGS. 5A and 5B illustrate areas formed by changes of the conductive spring 120 due to rotation. Not only when a vibration occurs in a certain direction but also when rotation occurs, the conductive spring 120 and the masses 110 move.

Figure 6A:
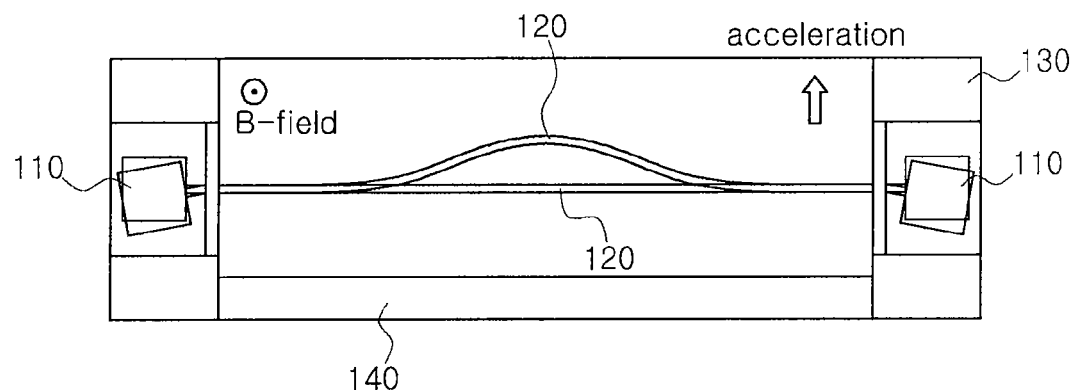
FIGS. 6A and 6B illustrate a micromachined sensor for measuring a vibration, according to another embodiment of the present invention.
Figure 6B:
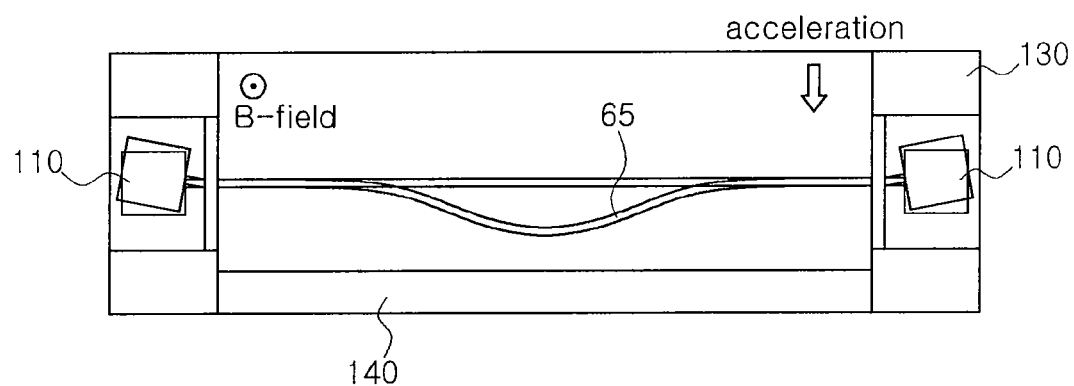

FIGS. 6A and 6B illustrate a micromachined sensor for measuring a vibration, according to another embodiment of the present invention.

Referring to FIGS. 6A and 6B, different form the micromachined sensor of FIGS. 1A and 1B, the masses 110 are attached to both ends of the conductive spring 120, instead of the middle of the conductive spring 120. Since other elements excluding the masses 110 are identical to those shown in FIGS. 1A and 1B, the micromachined sensor for measuring a vibration includes elements as follows.

The micromachined sensor of FIGS. 6A and 6B includes the substrate 160, the conductive spring 120 including the masses 110 formed on the both ends thereof and moving according to a vibration and moving according to movement of the masses 110, the fixing units 130 separating the masses 110 and the conductive spring 120 from the substrate 160, and the magnetic body 170 formed on a bottom of the substrate 160 and forming a magnetic field.

Only, in the present embodiment, the masses 110 are formed on the both ends of the conductive spring 120 and are present in spaces formed by the fixing units 130. The movement of the masses 110 is generated by the vibration and the conductive spring 120 moves due to the movement in the magnetic field formed by the magnetic body 170, thereby forming an induced current, identical to the micromachined sensor of FIGS. 1A and 1B.

While the present invention has been shown and described in connection with the exemplary embodiments, it will be apparent to those skilled in the art that modifications and variations can be made without departing from the spirit and scope of the invention as defined by the appended claims.

What is claimed is:

1. A micromachined sensor for measuring a vibration, the sensor comprising:
    a substrate;
    at least one masses configured to move in response to the vibration and arranged over the substrate;
    a conductive elastic member coupled to the mass and configured to be movable over the substrate,
    a fixing unit configured to partially fix the conductive elastic member over the substrate; and
    a magnetic body formed over a bottom of the substrate and forming a magnetic field
    wherein motion of the conductive elastic member through the magnetic field generates an induced current,
    wherein the conductive elastic member is configured to deform in at least two axes.

2. The sensor of claim 1, wherein the fixing unit is coupled to both ends of the conductive elastic member.

3. The sensor of claim 2, wherein the at least one mass is located at the middle of the conductive elastic member.

4. The sensor of claim 1, further comprising a resistor coupled to the fixing unit, wherein at least the conductive elastic member, the resistor and the fixing unit form of a closed circuit together.

5. The sensor of claim 1, further comprising a converter converting the induced current generated due to movement of the conductive elastic member into a voltage.

6. The sensor of claim 1, wherein the magnetic body is further formed over a top of the fixing unit.

7. A device measuring a vibration comprising two of the micromachined sensors of claim 1,
    wherein the two micromachined sensors are vertically disposed with two axes to measure vibrations.

8. A micromachined sensor for measuring a vibration, the sensor comprising:
    a substrate;
    a conductive member having elasticity, the conductive member being movable over the substrate according to the vibration,
    a first mass coupled to a first end of the conductive member,
    a second mass coupled to a second end of the conductive member;
    a fixing unit partially fixing the conductive member over the substrate; and
    a magnetic body formed over a bottom of the substrate and forming a magnetic
    wherein the conductive member is configured to generate induced current through interaction with the magnetic body.

9. The sensor of claim 8, wherein the fixing unit comprises spaces to allow the first and second masses to move, while supporting the conductive member.

10. The sensor of claim 8, further comprising a resistor coupled to the fixing unit, wherein the conductive member, the resistor and the fixing unit form of a closed circuit.

11. The sensor of claim 8, further comprising a converter configured to convert an induced current generated due to movement of the conductive member into a voltage.

12. The sensor of claim 8, wherein the magnetic body is further formed over a top of the fixing unit.

13. A device measuring a vibration comprising two of the micromachined sensors of claim 8, wherein the two micromachined sensors are vertically disposed with two axes to measure vibrations.

14. The sensor of claim 8, wherein the first and second masses are in a symmetric configuration with respect to the conductive member.

15. A micromachined sensor for measuring a vibration, the sensor comprising:
    a substrate;
    one or more of first and second masses configured to move in response to vibration and arranged over the substrate;
    a member having elasticity and configured to be movable over the substrate;
    a fixing unit configured to partially fix the conductive member over the substrate; and
    a magnetic body formed over a bottom of the substrate and forming a magnetic field,
    wherein the conductive member is coupled to the first and the second masses and moves in response to the movement of the first and the second masses to generate induced current through interaction with the magnetic body, and
    wherein the first and the second masses have a symmetric configuration with respect to the conductive member.

16. The sensor of claim 1, wherein the conductive elastic member is in the form of a wire.

17. The sensor of claim 1, wherein the deformation over time defines a volume and the volume is correlated to a degree of vibration.

18. The sensor of claim 1, wherein sensor includes a plurality of the masses capable of moving in response to vibration.

* * * * *